United States Patent
Kim et al.

(10) Patent No.: US 9,074,094 B2
(45) Date of Patent: Jul. 7, 2015

(54) THERMOPLASTIC RESIN COMPOSITION AND MOLDED PRODUCT INCLUDING SAME

(71) Applicant: Cheil Industries Inc., Gumi-si (KR)

(72) Inventors: Doo-Young Kim, Uiwang-si (KR); Jung-Hun Lee, Uiwang-si (KR); Jin-Kyung Cho, Uiwang-si (KR); Do-Hoon Chang, Uiwang-si (KR); Chang-Min Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/143,067

(22) Filed: Dec. 30, 2013

(65) Prior Publication Data

US 2014/0187686 A1 Jul. 3, 2014

(30) Foreign Application Priority Data

Dec. 31, 2012 (KR) .................. 10-2012-0158706

(51) Int. Cl.
*C08F 290/06* (2006.01)
*C08K 3/28* (2006.01)
*C08F 283/00* (2006.01)
*C08F 12/28* (2006.01)
*C08F 16/12* (2006.01)
*C08L 71/12* (2006.01)
*C08L 77/02* (2006.01)
*C08L 77/06* (2006.01)
*C08K 5/092* (2006.01)
*C08K 5/1539* (2006.01)

(52) U.S. Cl.
CPC ............. *C08L 71/123* (2013.01); *C08K 5/092* (2013.01); *C08K 5/1539* (2013.01); *C08L 77/02* (2013.01); *C08L 77/06* (2013.01)

(58) Field of Classification Search
CPC ............................ C08L 71/123; C08L 77/00
USPC ............ 524/81, 428; 525/540; 526/310, 333, 526/513

See application file for complete search history.

(56) References Cited

U.S. PATENT DOCUMENTS

| 4,839,425 A | * | 6/1989 | Mawatari et al. | ........... 525/92 B |
| 5,104,937 A | | 4/1992 | Saito et al. | |
| 5,741,846 A | | 4/1998 | Lohmeijer et al. | |
| 5,977,240 A | | 11/1999 | Lohmeijer et al. | |
| 7,022,776 B2 | | 4/2006 | Bastiaens et al. | |
| 7,897,687 B2 | | 3/2011 | Miyoshi | |

FOREIGN PATENT DOCUMENTS

| JP | 05-005056 A | 1/1993 |
| JP | 06-009820 | 9/1994 |
| JP | 2005-508425 A | 3/2005 |
| JP | 4040073 B2 | 1/2008 |
| KR | 10-0262771 B1 | 8/2000 |

* cited by examiner

*Primary Examiner* — William Cheung
(74) *Attorney, Agent, or Firm* — Additon, Higgins & Pendleton, P.A.

(57) ABSTRACT

A thermoplastic resin composition includes a base resin including (A) about 16 to about 73 wt % of polyphenylene ether; (B) about 18 to about 82 wt % of polyamide; and (C) about 1 to about 20 wt % of a polyethylene-based polymer; (D) about 0.05 to about 1 part by weight of a multi-functional compatibilizer having at least two carboxyl groups and (E) about 0.05 to about 1 part by weight of a multi-functional compatibilizer having a carboxyl group or an acid anhydride group along with a carbon-carbon double bond, based on about 100 parts by weight of the base resin.

6 Claims, No Drawings

US 9,074,094 B2

THERMOPLASTIC RESIN COMPOSITION AND MOLDED PRODUCT INCLUDING SAME

CROSS-REFERENCE TO RELATED APPLICATION

This application claims priority to and the benefit of Korean Patent Application No. 10-2012-0158706 filed in the Korean Intellectual Property Office on Dec. 31, 2012, the entire disclosure of which is incorporated herein by reference.

FIELD OF THE INVENTION

A thermoplastic resin composition and a molded product including the same are disclosed.

BACKGROUND OF THE INVENTION

A polyphenylene ether is a thermoplastic resin having improved mechanical properties, heat resistance, and dimensional stability. When the polyphenylene ether is used alone, however, it may exhibit insufficient impact characteristics and poor chemical resistance, and its high melt viscosity may result in its poor processability.

Accordingly, the polyphenylene ether may be blended with polyamide to improve processability as a plastic material. However, the polyphenylene ether and the polyamide have poor compatibility for each other, and thus a molded product made of a resin composition prepared by melt-blending the polyphenylene ether and the polyamide may have a low impact strength or tensile strength, low heat resistance, and poor appearance.

SUMMARY OF THE INVENTION

One embodiment provides a thermoplastic resin composition capable of manufacturing a molded product that can have improved properties such as high impact strength, tensile strength, and the like, heat resistance, and excellent appearance, through melt blending.

Another embodiment provides a molded product manufactured from the thermoplastic resin composition.

According to one embodiment, a thermoplastic resin composition includes a base resin including (A) about 16 to about 73 wt % of polyphenylene ether; (B) about 18 to about 82 wt % of polyamide; and (C) about 1 to about 20 wt % of a polyethylene-based polymer; and with respect to about 100 parts by weight of the base resin, (D) about 0.05 to about 1 part by weight of a multi-functional compatibilizer having at least two carboxyl groups and (E) about 0.05 to about 1 part by weight of a multi-functional compatibilizer having a carboxyl group or an acid anhydride group along with a carbon-carbon double bond.

The polyphenylene ether (A) may have a number average molecular weight of about 9,000 to about 50,000 g/mol and a polydispersity index of about 1.0 to about 2.5. The polyamide (B) may have a number average molecular weight of about 3,000 to about 50,000 g/mol and polydispersity index of about 1.0 to about 5.0.

The polyethylene-based polymer (C) may have a weight average molecular weight of about 10,000 to about 300,000 g/mol.

The polyethylene-based polymer (C) may include high density polyethylene (HDPE), linear low density polyethylene (LLDPE), low density polyethylene (LDPE), an ethylene-octene copolymer, ultra-low density polyethylene, medium density polyethylene, an ethylene-propylene copolymer, an ethylene-butene copolymer, or a combination thereof.

The multi-functional compatibilizer having at least two carboxyl groups (D) may include citric acid, malic acid, agaricic acid, or a combination thereof.

The multi-functional compatibilizer having a carboxyl group or an acid anhydride group along with a carbon-carbon double bond (E) may include maleic acid, fumaric acid, itaconic acid, maleic anhydride, itaconic anhydride, aconitic acid, or a combination thereof.

A molded product according to another embodiment is manufactured from the thermoplastic resin composition.

A polyphenylene ether-based thermoplastic resin composition capable of manufacturing a molded product that can have improved properties such as mechanical strength, heat resistance, and the like and having improved appearance, and a molded product having improved appearance manufactured therefrom may be provided.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to one embodiment includes about 100 parts by weight of a base resin including (A) about 16 to about 73 wt %, for example about 19 to about 70 wt % of polyphenylene ether; (B) about 18 to about 82 wt %, for example about 20 to about 80 wt % of polyamide; and (C) about 1 to about 20 wt %, for example about 1 to about 10 wt % of a polyethylene-based polymer; and, with respect to about 100 parts by weight of the base resin, (D) about 0.05 to about 1 part by weight of a multi-functional compatibilizer having at least two carboxyl groups, and (E) about 0.05 to about 1 part by weight of a multi-functional compatibilizer having a carboxyl group or an acid anhydride group along with a carbon-carbon double bond.

In some embodiments, the base resin may include the polyphenylene ether (PPE) in an amount of about 16, 17, 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, or 73 wt %. Further, according to some embodiments of the present invention, the amount of the polyphenylene ether can be in a range from about any of the foregoing amounts to about any other of the foregoing amounts.

In some embodiments, the base resin may include the polyamide (PA) in an amount of about 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, or 82 wt %. Further, according to some embodiments of the present invention, the amount of the polyamide can be in a range from about any of the foregoing amounts to about any other of the foregoing amounts.

In some embodiments, the base resin may include the polyethylene-based polymer in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the polyethylene-based polymer can be in a range from about any of the foregoing amounts to about any other of the foregoing amounts.

In some embodiments, the thermoplastic resin composition may include the multi-functional compatibilizer having at least two carboxyl groups in an amount of about 0.05, 0.06, 0.07, 0.08, 0.09, 0.1, 0.2, 0.3, 0.4, 0.5, 0.6, 0.7, 0.8, 0.9, or 1 part by weight. Further, according to some embodiments of the present invention, the amount of the multi-functional compatibilizer having at least two carboxyl groups can be in a range from about any of the foregoing amounts to about any other of the foregoing amounts.

In some embodiments, the thermoplastic resin composition may include the multi-functional compatibilizer having a carboxyl group or an acid anhydride group along with a carbon-carbon double bond in an amount of about 0.05, 0.06, 0.07, 0.08, 0.09, 0.1, 0.2, 0.3, 0.4, 0.5, 0.6, 0.7, 0.8, 0.9, or 1 part by weight. Further, according to some embodiments of the present invention, the amount of the multi-functional compatibilizer having a carboxyl group or an acid anhydride group along with a carbon-carbon double bond can be in a range from about any of the foregoing amounts to about any other of the foregoing amounts.

Hereinafter, each component is specifically described.
(A) Polyphenylene Ether

In the thermoplastic resin composition, the polyphenylene ether (PPE) is a polymer including the following phenyleneoxy repeating unit:

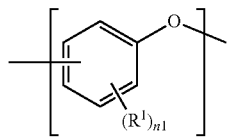

As used herein, each $R^1$ is the same or different and each is independently halogen, a substituted or unsubstituted C1 to C30 aliphatic organic group, a substituted or unsubstituted C2 to C30 aromatic organic group, or substituted or unsubstituted C1 to C30 alkoxy group, and each n1 is the same or different in each repeating unit and each is independently an integer ranging from 0 to 4.

As used herein, when a specific definition is not otherwise provided, the term "substituted" refers to one substituted with halogen (F, Cl, Br, or I), a hydroxy group, a C1 to C20 alkoxy group, a nitro group, a cyano group, an amine group, an imino group, an azido group, an amidino group, a hydrazino group, hydrazono group, a carbonyl group, a carbamyl group, a thiol group, an ester group, an ether group, a carboxyl group or a salt thereof, a sulfonic acid group or a salt thereof, a phosphoric acid or a salt thereof, C1 to C20 alkyl, C2 to C20 alkenyl, C2 to C20 alkynyl, C6 to C20 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C20 heteroaryl, or a combination thereof, in place of at least one hydrogen.

As used herein, when a specific definition is not otherwise provided, the term "hetero" may refer to one substituted with at least one hetero atom including N, O, S, P, or a combination thereof, in place of at least one C in a cyclic substituent.

As used herein, when a specific definition is not otherwise provided, the term "aliphatic" may refer to C1 to C30 alkyl, C2 to C30 alkenyl, C2 to C30 alkynyl, C1 to C30 alkylene, C2 to C30 alkenylene, or C2 to C30 alkynylene, for example C1 to C20 alkyl, C2 to C20 alkenyl, C2 to C20 alkynyl, C1 to C20 alkylene, C2 to C20 alkenylene, or C2 to C20 alkynylene. As used herein, when a specific definition is not otherwise provided, the term aliphatic may also refer to C3 to C30 cycloalkyl, C3 to C30 cycloalkenyl, C3 to C30 cycloalkynyl, C3 to C30 cycloalkylene, C3 to C30 cycloalkenylene, or C3 to C30 cycloalkynylene, for example C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene. As used herein, when a specific definition is not otherwise provided, the term "aromatic" may refer to C6 to C30 aryl, C2 to C30 heteroaryl, C6 to C30 arylene, or C2 to C30 heteroarylene, for example C6 to C16 aryl, C2 to C16 heteroaryl, C6 to C16 arylene, or C2 to C16 heteroarylene.

The polyphenylene ether may be prepared by condensation-polymerization of at least one phenol compound represented by the following Chemical Formula 1:

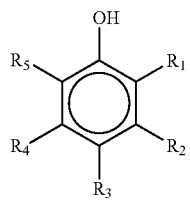

[Chemical Formula 1]

In the Chemical Formula 1, $R_1$, $R_2$, $R_3$, $R_4$ and $R_5$ are the same or different and are independently hydrogen, halogen, or a substituted or unsubstituted C1 to C20 aliphatic and/or aromatic organic group (e.g., a hydrocarbon group), provided that at least one of $R_1$, $R_2$, $R_3$, $R_4$ and $R_5$ is hydrogen.

In exemplary embodiments, in the above Chemical Formula 1, $R_1$, $R_2$, $R_3$, $R_4$ and $R_5$ are the same or different and may be independently hydrogen, chlorine, bromine, fluorine, iodine, primary and/or secondary C1 to C7 lower alkyl, phenyl, haloalkyl, aminoalkyl, hydrocarbonoxy, and/or halohydrocarbonoxy. In the above Chemical Formula 1, examples of $R_1$, $R_2$, $R_3$, $R_4$ and $R_5$ may include without limitation methyl, ethyl, n- and/or iso-propyl, pri-, sec-, and/or t-butyl, chloroethyl, hydroxyethyl, phenylethyl, benzyl, hydroxymethyl, aminomethyl, aminoethyl, carboxylethyl, methoxycarbonylethyl, cyanoethyl, phenyl, chlorophenyl, methylphenyl, dimethylphenyl, ethylphenyl, allyl, and the like, and combinations thereof.

Examples of the compound represented by the above Chemical Formula 1 may include without limitation phenol, o-, m-, and/or p-cresol, 2,6-, 2,5-, 2,4- and/or 3,5-dimethylphenol, 2-methyl-6-phenylphenol, 2,6-diphenylphenol, 2,6, -diethylphenol, 2-methyl-6-ethylphenol, 2,3,5-, 2,3,6-, and/or 2,4,6-trimethylphenol, 3-methyl-6-t-butylphenol, 2-methyl-6-allylphenol, and the like, and combinations thereof. Examples of the polyphenylene ether resin may include without limitation poly(1,4-phenylene ether), poly(1,3-phenylene ether), poly(1,2-phenylene ether), poly(2-methyl-1,4-phenylene ether), poly(3-methyl-1,4-phenylene ether), poly(2-methyl-1,3-phenylene ether), poly(4-methyl-1,3-phenylene ether), poly(5-methyl-1,3-phenylene ether), poly(6-methyl-1,3-phenylene ether), poly(3-methyl-1,2-phenylene ether), poly(4-methyl-1,2-phenylene ether), poly(5-methyl-1,2-phenylene ether), poly(6-methyl-1,2-phenylene ether), poly(2,6-dimethyl-1,4-phenylene ether), poly(2,3-dimethyl-1,4-phenylene ether), poly(3,5-dimethyl-1,4-phenylene ether), poly(2,5-dimethyl-1,4-phenylene ether), poly(2,4-dimethyl-1,3-phenylene ether), poly(2,5-dimethyl- 1,3-phenylene ether), poly(2,6-dimethyl-1,3-phenylene ether), poly(4,5-dimethyl-1,3-phenylene ether), poly(4,6-dimethyl-1,3-phenylene ether), poly(5,6-dimethyl-1,3-phenylene ether), poly(3,4-dimethyl-1,2-phenylene ether), poly(3,5-dimethyl-1,2-phenylene ether), poly(3,6-dimethyl-1,2-phenylene ether), poly(4,5-dimethyl-1,2-phenylene ether), poly(4,6-dimethyl-1,2-phenylene ether), poly(5,6-dimethyl-1,2-phenylene ether), and the like, and combinations thereof.

In the thermoplastic resin composition, the polyphenylene ether may have a number average molecular weight (Mn) of about 9,000 to about 50,000 g/mol and a polydispersity index (PDI) of about 1.0 to about 2.5.

The polyphenylene ether may be prepared by any known method or is commercially available. Examples of the commercially available polyphenylene ether may include without limitation PX100 series of Mitsubishi engineering plastics Corporation, LXR series of Bluestar Co., Ltd., and combinations thereof.

(B) Polyamide

Polyamide (PA) that may be used in the aforementioned thermoplastic resin composition is a polymer having an amide group (—NHCO—) in its main chain, and its kinds are not particularly limited.

For example, the polyamide may be prepared by ring-opening polymerization of lactams, condensation polymerization of diamine and dicarboxylic acid, condensation polymerization of aminocarboxylic acid, and the like, but is not limited thereto.

The diamine may be aliphatic, alicyclic, and/or aromatic diamine. Examples of the diamine may include without limitation tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnonamethylenediamine, 1,3-bisaminomethylcyclohexane, 1,4-bisaminomethylcyclohexane, m-phenylenediamine, p-phenylenediamine, m-xylenediamine, p-xylenediamine, and the like, and combinations thereof.

The dicarboxylic acid may include aliphatic, alicyclic, and/or aromatic dicarboxylic acid. Examples of the dicarboxylic acid may include without limitation adipic acid, suberic acid, azelaic acid, dodecane dicarboxylic acid, 1,1,3-tridecane dicarboxylic acid, 1,3-cyclohexane dicarboxylic acid, terephthalic acid, isophthalic acid, naphthalene dicarboxylic acid, dimeric acid, and the like, and combinations thereof.

Examples of the lactams may include without limitation ∈-caprolactam, enanthlactam, ω-laurolactam, and the like, and combinations thereof.

Examples of amino carboxylic acid may include without limitation ∈-aminocaproic acid, 7-amino-heptanoic acid, 8-amino-octanoic acid, 9-amino-noannoic acid, 11-amino-undecanoic acid, 12-amino-dodecanoic acid, 13-amino-tridecanoic acid, and the like, and combinations thereof.

The lactams, the diamines, the dicarboxylic acids and the aminocarboxylic acids may be subject to condensation polymerization alone or in a combination of at least two compounds to provide a polyamide homopolymer or a polyamide copolymer. The polyamide may be prepared by any conventional polymerization method, for example, solution polymerization, interface polymerization, melt polymerization, bulk polymerization, solid-state polymerization, and the like.

Examples of the polyamide may include without limitation nylon 6, nylon 66, nylon 46, nylon 11, nylon 12, nylon 610, nylon 612, nylon 6/66, nylon 6/612, nylon 6/MXD (metaxylenediamine), polyamide 6T, polyamide 6I, polyamide 66/I, polyamide 6T/6I, polyamide 9T, and the like, and combinations thereof.

The polyamide (B) may have a number average molecular weight (Mn) of about 3,000 to about 50,000 g/mol and a polydispersity index (PDI) of about 1.0 to about 5.0.

The polyamide may be prepared by a well-known method or may be commercially available. Examples of the commercially available polyamide resin may include without limitation Vydyne series of Ascend Performance Materials LLC., Stabamid of Rhodia Inc., Radilon of Radici Plastics, Torzen of Invista Engineering Polymers, and the like, and combinations thereof.

(C) Polyethylene-Based Polymer

The polyethylene-based polymer may be an ethylene homopolymer and/or an ethylene copolymer. The polyethylene-based polymer may be used alone or in a mixture of at least two compounds. The polyethylene-based polymer may have a weight average density of less than or equal to about 0.95 g/cm$^3$, for example less than or equal to about 0.94 g/cm$^3$, and as another example about 0.91 g/cm$^3$ to 0.94 g/cm$^3$, but it is not limited thereto. The weight average density is obtained by multiplying the weight of each polyethylene-based polymer by the density of the polyethylene-based polymers and averaging the products. When a resin is used alone, the density of the resin is a weighted average density.

The polyethylene-based polymer may have a melt index (MI) of about 0.1 g/10 min to about 30 g/10 min, without limitation. When the polyethylene-based polymer has a melt index within this range, the polyethylene-based polymer may be easily mixed with another resin and thus can effectively improve mechanical strength of a thermoplastic resin composition including the polyethylene-based polymer.

The polyethylene-based polymer may have a melting point of about 80° C. to about 170° C., for example about 95° C. to about 135° C., and as another example about 105° C. to about 125° C., without limitation. When the polyethylene-based polymer has a melting point within the above range, heat resistance and mechanical strength of the thermoplastic resin composition including the polyethylene-based polymer may be effectively improved.

The polyethylene-based polymer may have a weight average molecular weight (Mw) of about 10,000 to about 300,000 g/mol, for example about 40,000 to about 150,000 g/mol, without limitation. When the polyethylene-based polymer has a weight average molecular weight (Mw) within the aforementioned range, the thermoplastic resin composition may be easily processed, and mechanical strength of the thermoplastic resin composition including the polyethylene-based polymer may be effectively improved.

Specific examples of the polyethylene-based polymer may include without limitation high density polyethylene (HDPE), linear low density polyethylene (LLDPE), low density polyethylene (LDPE), an ethylene-octene copolymer, ultra-low density polyethylene, medium density polyethylene, an ethylene-propylene copolymer, an ethylene-butene copolymer, and the like, and combinations thereof.

(D) Multi-Functional Compatibilizer Having at Least Two Carboxyl Groups

The thermoplastic resin composition includes a multi-functional compatibilizer having at least two carboxyl groups in an amount of about 0.05 to about 1 part by weight, for example about 0.1 to about 0.5 parts by weight, based on about 100 parts by weight of the base resin. Examples of the multi-functional compatibilizer having at least two carboxyl groups may include without limitation citric acid, malic acid, agaricic acid, and the like, and combinations thereof.

As described above, polyphenylene ether and polyamide have insufficient compatibility with one another and a thermoplastic resin composition thereof prepared by any conventional melt blending cannot avoid a decrease in impact strength and tensile strength. Such a decrease in the properties is believed to be caused by insufficient interfacial adherence between a dispersed phase and a continuous phase in the composition.

When the multi-functional compatibilizer having at least two carboxyl groups is used alone, the interface adherence may be improved, but polyamide may undergo decomposition resulting from an unreacted compatibilizer during the melt blending process, and thus, may deteriorate properties of a molded product such as mechanical strength, heat resistance, and the like.

In the thermoplastic resin composition according to an embodiment of the present invention, the multi-functional compatibilizer having at least two carboxyl groups is used together with the multi-functional compatibilizer having a carboxyl group or an acid anhydride group along with a carbon-carbon double bond (as described below) and thus, it may improve reactivity of polyphenylene ether with polyamide, promote activity of a polyphenylene ether-based resin composition, and provide a molded product that can have improved mechanical strength and heat resistance and improved appearance without deteriorating properties due to an unreacted compatibilizer.

(E) Multi-functional Compatibilizer Having Carboxyl Group or Acid Anhydride Group Along with Carbon-Carbon Double Bond The thermoplastic resin composition includes the multi-functional compatibilizer having a carboxyl group or an acid anhydride group along with a carbon-carbon double bond (E) in an amount of about 0.05 to about 1 part by weight, for example about 0.1 to about 0.5 parts by weight, based on about 100 parts by weight of the base resin, in addition to the multi-functional compatibilizer having at least two carboxyl groups (D). Examples of the multi-functional compatibilizer having a carboxyl group or an acid anhydride group along with a carbon-carbon double bond (E) may include without limitation maleic acid, fumaric acid, itaconic acid, maleic anhydride, itaconic anhydride aconitic acid, and the like, and combinations thereof. As described above, the multi-functional compatibilizer having a carboxyl group or an acid anhydride group along with a carbon-carbon double bond (E) may improve compatibility between polyphenylene ether and polyamide in a thermoplastic resin composition including the polyphenylene ether and the polyamide and can effectively suppress decomposition of the polyamide and the like due to the unreacted compatibilizer when used with the multi-functional compatibilizer having at least two carboxyl groups (D) and thus, may provide a molded product that can have higher mechanical strength and heat resistance and more improved appearance.

A ratio of the multi-functional compatibilizer having a carboxyl group or an acid anhydride group along with a carbon-carbon double bond (E) relative to the multi-functional compatibilizer having at least two carboxyl groups (D) may be about 1:5 to about 5:1.

(F) Other Components

The thermoplastic resin composition may further include an impact-reinforcing agent besides the components of the (A) to (E), as needed. The impact-reinforcing agent may be a general-used impact-reinforcing agent in a thermoplastic resin composition including polyphenylene ether and polyamide without limitation. Examples of the impact-reinforcing agent may include without limitation ABA triblock copolymers, AB diblock copolymers (wherein A is aromatic vinyl-based block, and B is a rubber-based block), and the like, and combinations thereof. Examples of the ABA triblock copolymer and AB diblock copolymer may include without limitation polystyrene-polybutadiene, polystyrene-poly(ethylene-propylene), polystyrene-polyisoprene, polystyrene-polybutadiene-polystyrene, polystyrene-polyethylenebutylene-polystyrene (SEBS), and the like, and combinations thereof. The impact-reinforcing agent may be used in an amount of less than or equal to about 10 parts by weight, for example about 0.1 to about 10 parts by weight based on about 100 parts by weight of the base resin, without limitation.

In addition, the thermoplastic resin composition may further include one or more additives other than the aforementioned components, for example to improve molding properties such as injection molding properties and the like, to achieve a balance between each property and/or to satisfy final purposes of the thermoplastic resin composition. Examples of the additives may include without limitation flame retardants, surfactants, nucleating agents, coupling agents, filler, plasticizers, lubricants, antibacterial agents, release agents, heat stabilizers, antioxidants, light stabilizers, inorganic material additives, colorants such as pigments and/or dyes, stabilizers, antifriction agents, anti-static agents, flame proofing agents, and the like, and these may be used singularly or in a combination of two or more. These additives may be appropriately included within a range in which they will not harm to properties of a thermoplastic resin composition, for example, in an amount of less than or equal to about 20 parts by weight, as another example, in an amount of less than or equal to about 10 parts by weight, as another example, in an amount of less than or equal to about 5 parts by weight, and as another example, in an amount of less than or equal to about 3 parts by weight, based on about 100 parts by weight of a base resin, without limitation.

Another embodiment of the present invention provides a molded product including the thermoplastic resin composition. The molded product may be manufactured by using the thermoplastic resin composition in various methods such as injection molding, extrusion molding, and the like, which are well known in a related art.

The thermoplastic resin composition may be easily manufactured into a molded product that can have high mechanical properties such as impact strength, hardness, and the like, heat resistance, and improved appearance, and the molded product can have almost no appearance defect and very satisfactory balance of properties. Thus, the thermoplastic resin composition of the present invention may be used for a part for an electric/electronic device, an auto member, a building member, and the like.

EXAMPLES

Hereinafter, the present invention is illustrated in more detail with reference to the following examples and comparative examples. However, the following examples and comparative examples are provided for the purpose of description only and the present invention is not limited thereto.

Examples 1 to 4

The components in the following Table 1 are mixed in the amounts provided in the following Table 1 (unit: part by weight) and then, melt-kneaded and extruded into pellets. The extrusion is performed by using a twin-screw extruder having L/D=44 and a diameter of 35 mm and set at a barrel temperature of 330° C.

Comparative Examples 1 to 8

Each pellet-shaped resin composition is manufactured according to the same method as Examples 1 to 4 except for using the components in the amounts set forth in the following Table 1.

TABLE 1

|  | Examples | | | | Comparative Examples | | | | | | | |
|---|---|---|---|---|---|---|---|---|---|---|---|---|
|  | 1 | 2 | 3 | 4 | 1 | 2 | 3 | 4 | 5 | 6 | 7 | 8 |
| (A) polyphenylene ether (part by weight) | 70 | 70 | 19 | 19 | 75 | 75 | 14 | 14 | 70 | 70 | 19 | 19 |
| (B) polyamide (part by weight) | 20 | 20 | 80 | 80 | 15 | 15 | 85 | 85 | 20 | 20 | 80 | 80 |
| (C) linear low density polyethylene (part by weight) | 10 | 10 | 1 | 1 | 10 | 10 | 1 | 1 | 10 | 10 | 1 | 1 |
| (D) citric acid (part by weight) | 0.1 | 0.5 | 0.1 | 0.5 | 0.1 | 0.5 | 0.1 | 0.5 | 0.6 | — | 0.6 | — |
| (E) maleic anhydride (part by weight) | 0.5 | 0.1 | 0.5 | 0.1 | 0.5 | 0.1 | 0.5 | 0.1 | — | 0.6 | — | 0.6 |

(A) Polyphenylene ether: Bluestar Co., Ltd., LXR-035C, (Mn 24,000 g/mol, PDI 1.35)
(B) Polyamide (PA): Ascend Performance Materials LLC., Vydyne 50BW (Mn 25,000 g/mol, PDI 1.9)
(C) Linear low density polyethylene (LLDPE): Hanwha Chemical Corporation, LLDPE 9730 (Mw 75,000 g/mol, PDI 1.5, density 0.92 g/cm$^3$)
(D) Citric acid: Samchun Chemical Co.
(E) Maleic anhydride: Yongsan Chemicals, Inc.

Property Evaluation

The pellets according to Examples 1 to 4 and Comparative Examples 1 to 8 are dried at 100° C. for 5 hours and manufactured into each specimen by using a 120 ton injection molding machine at a cylinder temperature of 280° C. and a molding temperature of 80° C. Each specimen is evaluated for impact strength, tensile strength, flexural modulus, heat resistance, and appearance with the naked eye, and the results are provided in Table 2.

(1) Impact strength (kgf·cm/cm):
Measured according to ASTM D256 Izod impact strength test method
(2) Tensile strength (kgf/cm$^2$):
Measured according to ASTM D638 tensile strength test method
(3) Flexural modulus (kgf/cm$^2$):
Measured according to ASTM D790 flexural modulus test method
(4) Heat resistance (° C.):
Measured according to ASTM D648 HDT test method
(5) Appearance:
Evaluated if surface gas mark or whitening are generated or not; when surface gas mark or whitening are generated: ○, when surface gas mark or whitening are not generated: ×

TABLE 2

|  | Examples | | | | Comparative Examples | | | | | | | |
|---|---|---|---|---|---|---|---|---|---|---|---|---|
|  | 1 | 2 | 3 | 4 | 1 | 2 | 3 | 4 | 5 | 6 | 7 | 8 |
| Impact strength [kgf · cm/cm] | 20 | 21 | 27 | 25 | 5 | 3 | 30 | 28 | 6 | 7 | 11 | 13 |
| Tensile strength [kgf/cm$^2$] | 700 | 680 | 550 | 540 | 720 | 700 | 400 | 380 | 550 | 220 | 430 | 450 |
| Flexural modulus [kfg/cm$^2$] | 22000 | 23000 | 20500 | 20100 | 22500 | 23500 | 17800 | 18000 | 19200 | 19800 | 18300 | 18500 |
| Heat resistance [° C.] | 207 | 205 | 198 | 195 | 206 | 204 | 182 | 179 | 204 | 203 | 185 | 185 |
| Appearance | ○ | ○ | ○ | ○ | ○ | ○ | ○ | ○ | x | x | x | x |

The results of Table 2 confirm that the specimens made of the thermoplastic resin compositions according to Examples 1 to 4 exhibit desirable balance of properties by accomplishing improved heat resistance as well as high impact strength, tensile strength, and flexural modulus and simultaneously, improved appearance. By contrast, the compositions according to Comparative Examples 1 to 8 don't have balance of impact strength, tensile strength, flexural modulus, and heat resistance and sometimes, exhibit poor appearance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising:
   a base resin comprising (A) about 16 to about 73 wt % of polyphenylene ether; (B) about 18 to about 82 wt % of polyamide; and (C) about 1 to about 20 wt % of a polyethylene-based polymer;
   (D) about 0.05 to about 1 part by weight based on about 100 parts by weight of the base resin of a multi-functional compatibilizer having at least two carboxyl groups, wherein the multi-functional compatibilizer having at least two carboxyl groups (D) comprises citric acid, malic acid, agaricic acid, or a combination thereof; and (E) about 0.05 to about 1 part by weight based on about 100 parts by weight of the base resin of a multi-functional compatibilizer having a carboxyl group or an acid anhydride group along with a carbon-carbon double bond.

2. The thermoplastic resin composition of claim 1, wherein the polyphenylene ether (A) has a number average molecular weight of about 9,000 to about 50,000 g/mol and a polydispersity index of about 1.0 to about 2.5, and the polyamide (B) has a number average molecular weight of about 3,000 to about 50,000 g/mol and polydispersity index of about 1.0 to about 5.0.

3. The thermoplastic resin composition of claim 1, wherein the polyethylene-based polymer (C) has a weight average molecular weight of about 10,000 to about 300,000 g/mol.

4. The thermoplastic resin composition of claim 1, wherein the polyethylene-based polymer (C) comprises high density polyethylene (HDPE), linear low density polyethylene (LLDPE), low density polyethylene (LDPE), an ethylene-octene copolymer, ultra-low density polyethylene, medium density polyethylene, an ethylene-propylene copolymer, an ethylene-butene copolymer, or a combination thereof 5. The thermoplastic resin composition of claim 1, wherein the multi-functional compatibilizer having a carboxyl group or an acid anhydride group along with a carbon-carbon double bond (E) comprises maleic acid, fumaric acid, itaconic acid, maleic anhydride, itaconic anhydride, aconitic acid, or a combination thereof 6. A molded product comprising the thermoplastic resin composition of claim 1.

\* \* \* \* \*